Sept. 28, 1937.   A. C. FISCHER   2,094,571
SURFACING UNIT
Filed May 27, 1933

INVENTOR.
ALBERT C. FISCHER
BY
*Albert F. Robinson*
ATTORNEY.

Patented Sept. 28, 1937

2,094,571

UNITED STATES PATENT OFFICE 2,094,571

SURFACING UNIT

Albert C. Fischer, Chicago, Ill.

Application May 27, 1933, Serial No. 673,267

6 Claims. (Cl. 94—13)

This invention pertains to blocks, strips, or the like, which are adapted to be used for surfacing, such as in pavements, sidewalks, driveways, and the like, and particularly pertains to blocks which are adapted to be laid in abutting relation and secured in position to provide a surfacing layer.

The invention consists in the features, combinations and arrangements hereinafter described or claimed for carrying out the above stated object and such other objects as will hereinafter appear in the description.

The invention in general comprises blocks of wood, rubber composition or other material, which are adapted to be laid adjacent in staggered relation and provided with means for receiving fastening devices that secure the block together in a continuous surfacing layer.

The invention is typified by a block of substantial length and width, provided with means formed adjacent each end in which a securing means may be inserted and projected to engage similarly constructed blocks for securing the blocks together into a composite unit for surfacing sidewalks, drives, pavements, floors, alleyways, and the like.

For a better understanding of the invention reference may be had to the accompanying drawing, in which Fig. 1 is a perspective view of a block embodying the present invention;

Figure 1:
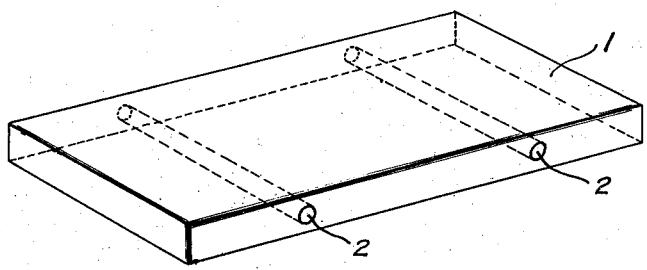
Figure 2:
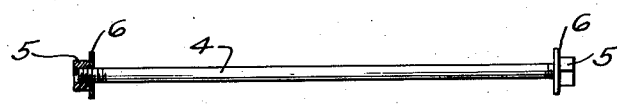
Fig. 2 is a detailed view of a tie-rod or other securing means for securing a series of the blocks together into a composite unit.

Referring specifically to the drawing, numeral 1 designates a block of creosoted wood, rubber, bituminous composition, or the like, cut or molded into substantial dimensions. For example, the strip or block may be substantially three feet long and twelve inches wide and several inches in thickness. This block may advantageously be provided adjacent its opposite ends with recesses or bores 2 which extend transversely of the width of the block. Any number of these blocks thus constructed may be transported to the place of use, laid in abutting relation to surface any desired area, and then secured in place, as hereinafter described. Or a series of these blocks may be fastened together at the place of manufacture and shipped as a unit. If the blocks are formed relatively small in size and light in weight they may be more advantageously made up as a unit and shipped in adjoined relation ready to be laid. However, if they are made substantially large in size and heavy in weight it is more practical to ship the blocks as individual units and secure them in place with other blocks at the time they are laid in the pavement.

The blocks are laid in rows lengthwise with the joints 3 of adjacent rows, arranged in staggered relation and with the recesses 2 of adjacent blocks in transverse alignment in order to receive a securing means 4, which are preferably of a length slightly exceeding the width of the paving. The securing means is inserted within the recesses of adjacent blocks and is of a sufficient length to project for the purpose of receiving securing nuts 5 on each end and washers 6, which are placed on the rod to be inserted between the nut and the outer rows of paving material. The washers by being interposed between the nuts 5 engage the sides of the surfacing block and prevent the nuts from going into the sides of the blocks.

Figure 3:
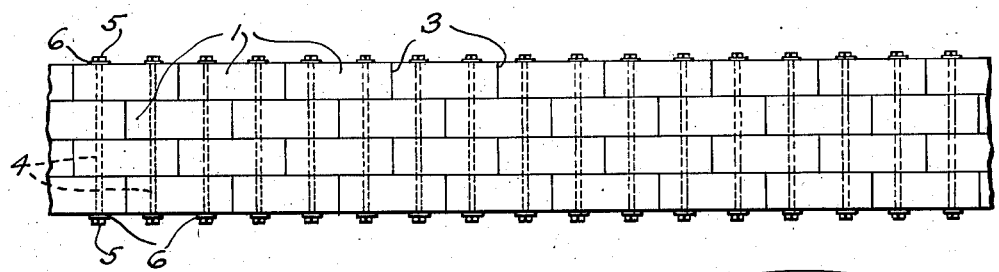
Fig. 3 is a top plan view of a road or pavement surfaced with a series of blocks secured together.
Figure 4:
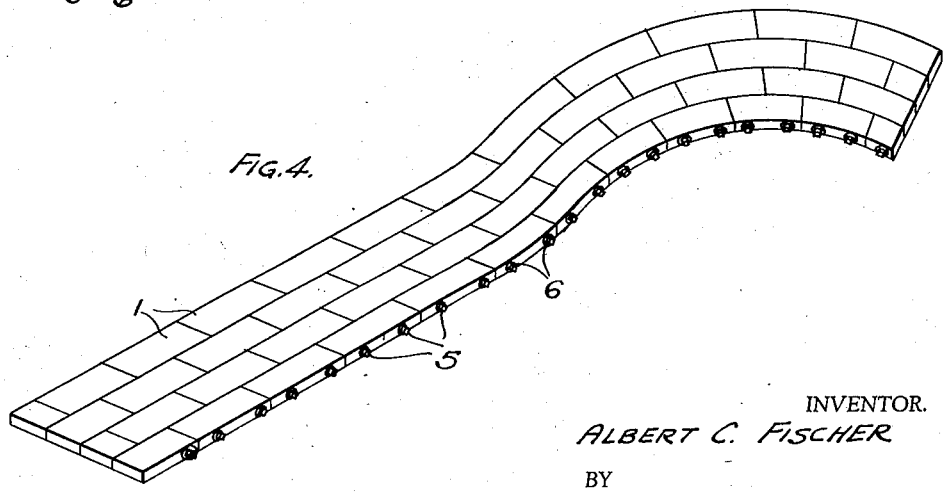
Fig. 4 is a perspective view of a driveway or walk composed of the surfacing units secured together into a composite surfacing layer.

In the surfacing layers illustrated in Figs. 3 and 4, the blocks are laid in four adjacent rows but it will be understood that there may be any number of rows which are more or less than the number of rows disclosed in the drawing. These surfacing materials or units are readily adapted to be laid on any foundation which is suitably prepared. For example the foundation of earth may be graded with dirt or cinders and smoothed in order to receive the surfacing units, or the foundation may be of concrete which is poured in place and adapted to receive the surfacing units. In the event that concrete is used, the surfacing blocks may be applied while the concrete layer is in a plastic condition so that when same hardens it will bond the blocks in place.

It may be preferable in some instances to have the nuts 5 and washers 6 countersunk in the outer rows of blocks, in which event the securing rods 4 may be of a length equal to the width of the combined thicknesses of the four rows of blocks. This is especially advantageous where it is desired to lay two similarly constructed surfacing sections alongside of each other in abutting relation. In this way the two surfacing sections may be laid abutting without being spaced from each other by the projecting ends. Moreover some of the rods 4 may be of sufficient length to extend through both of the surfacing sections, or the surfacing sections may be secured in any other desired manner at spaced intervals.

While I have described one preferred embodiment in detail it will be understood that such detailed construction is for the purpose of illustration and not as a limitation of the invention. Various changes may be made in details of construction without departing from the spirit of the invention.

I claim:

1. A surfacing layer comprising a series of brick shaped blocks of a water resistant elastic material having recesses provided at opposite ends, rods adapted to be inserted through the recesses for securing the blocks together in assembled relation, and screw-threaded clamping means fitted on the ends of the rods for drawing the blocks snugly together.

2. A surfacing layer comprising a series of brick shaped blocks of a water resistant elastic material having recesses provided at opposite ends and assembled in staggered rows with the recesses in transverse alignment, rods inserted through the recesses, and screw-threaded clamping means fitted on the ends of the rods for drawing the blocks snugly together.

3. A paving construction comprising a cement foundation, and a surfacing layer including a series of brick shaped blocks of a water resistant elastic material having recesses at opposite ends, and means inserted through the recesses for securing the blocks together, said surfacing layer being secured to the foundation.

4. A paving construction comprising a cement foundation, and a surfacing layer including a series of brick shaped blocks of a water resistant elastic material having recesses at opposite ends, and means inserted through the recesses for securing the blocks together, said surfacing layer being adhered to the foundation.

5. A surfacing assembly for paving construction including a series of brick-shaped blocks assembled in parallel rows and staggered with respect to blocks in adjacent rows, and means passing through said rows from side to side of said assembly for securing all of said blocks together, said blocks being yieldable whereby said assembly may be bent to form a curved pavement.

6. A surfacing assembly for paving construction, including a series of brick-shaped blocks assembled in parallel rows and staggered with respect to blocks in adjacent rows, and transversely extending means for securing each end of each block against one end of a block in an adjacent row for securing all of said blocks together, said blocks being yieldable, whereby said assembly may be bent to form a curved pavement.

ALBERT C. FISCHER.